US012282490B2

(12) United States Patent
Chen et al.

(10) Patent No.: US 12,282,490 B2
(45) Date of Patent: Apr. 22, 2025

(54) SYSTEMS AND METHOD FOR INFERRED GRAPH DATA LINK ATTESTATION

(71) Applicant: Wells Fargo Bank, N.A., San Francisco, CA (US)

(72) Inventors: Chao Chen, Short Hills, NJ (US); David Newman, Walnut Creek, CA (US); Nisha Rama Krishnan, Concord, CA (US); Steven Daryl McCullough, Ithaca, NY (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/365,586

(22) Filed: Aug. 4, 2023

(65) Prior Publication Data

US 2025/0045286 A1 Feb. 6, 2025

(51) Int. Cl.
*G06F 16/248* (2019.01)
*G06F 16/2458* (2019.01)
*G06F 16/28* (2019.01)

(52) U.S. Cl.
CPC ........ *G06F 16/248* (2019.01); *G06F 16/2458* (2019.01); *G06F 16/288* (2019.01)

(58) Field of Classification Search
CPC . G06F 3/04847; G06F 3/0482; G06F 16/9024

USPC ........................................................ 707/722
See application file for complete search history.

(56) References Cited

U.S. PATENT DOCUMENTS

| | | | |
|---|---|---|---|
| 2018/0349517 A1* | 12/2018 | Kleiman-Weiner | ... G06N 5/022 |
| 2021/0342541 A1* | 11/2021 | Taylor | ................. G06F 16/3328 |
| 2023/0252006 A1* | 8/2023 | Barlew | ................. G06T 11/206 |
| | | | 707/807 |

* cited by examiner

*Primary Examiner* — Hung T Vy
(74) *Attorney, Agent, or Firm* — SCHWEGMAN LUNDBERG & WOESSNER, P.A.

(57) ABSTRACT

A method may include presenting a user interface, the user interface including: a graph presentation area; and a graph link type confirmation area; executing a knowledge graph database search query; in response to the executing, receiving a set of tuple objects corresponding to relationships between entities in the knowledge graph database; populating the graph presentation area with representations of the entities and links connecting the representations of the entities; populating the graph link type confirmation area with a selectable user interface element configured to confirm a relationship of the relationships between entities; receiving activation of the selectable user interface element; and in response to receiving the activation, updating the graph presentation area.

17 Claims, 10 Drawing Sheets

| SERVICE | MATERIAL SERVICE PROVIDER | COMPONENT PROVIDER | COMPONENT | STATUS |
|---|---|---|---|---|
| AB1234 | MAIN BANK SECURITIES, LLC | MAIN BANK | ACME BANK - FOREIGN EXCHANGE | CONFIRMED |
| AB1234 | MAIN BANK SECURITIES, LLC | MAIN BANK | FOREIGN WIRE PROVIDER | CONFIRMED |

FIG. 7

SYSTEMS AND METHOD FOR INFERRED GRAPH DATA LINK ATTESTATION

Companies may have many subsidiaries and interact with thousands of services. In order to keep track of what services are being provided to which subsidiary, a spreadsheet may be used. The spreadsheet may identify other information about a subsidiary or service such as its location, in various examples.

BRIEF DESCRIPTION OF THE DRAWINGS

In the drawings, which are not necessarily drawn to scale, like numerals may describe similar components in different views. For example, FIG. 5 introduces graph link type confirmation area 502, which is also included in FIG. 6 and FIG. 8. Accordingly, the use of 502 in FIG. 6 and FIG. 8 indicate that user interface 600 and user interface 800 may also include a graph link type area such as described first with reference to FIG. 5. It does not, however, infer that the same data that is displayed within graph link type confirmation area 502 of FIG. 5 is always presented in graph link type confirmation area 502 of FIG. 6—as the area itself may be updated with new data, etc. Furthermore, the inclusion of graph link type confirmation area 502 in FIG. 6 or FIG. 8 does not imply on its own that the rest of FIG. 5 is necessarily incorporated into FIG. 6 or FIG. 8.

Like numerals having different letter suffixes may represent different instances of similar components. Some embodiments are illustrated by way of example, and not limitation, in the figures of the accompanying drawing.

FIG. 7 illustrates sample content of an output link confirmation report, according to various examples.

DETAILED DESCRIPTION

Figure 1:
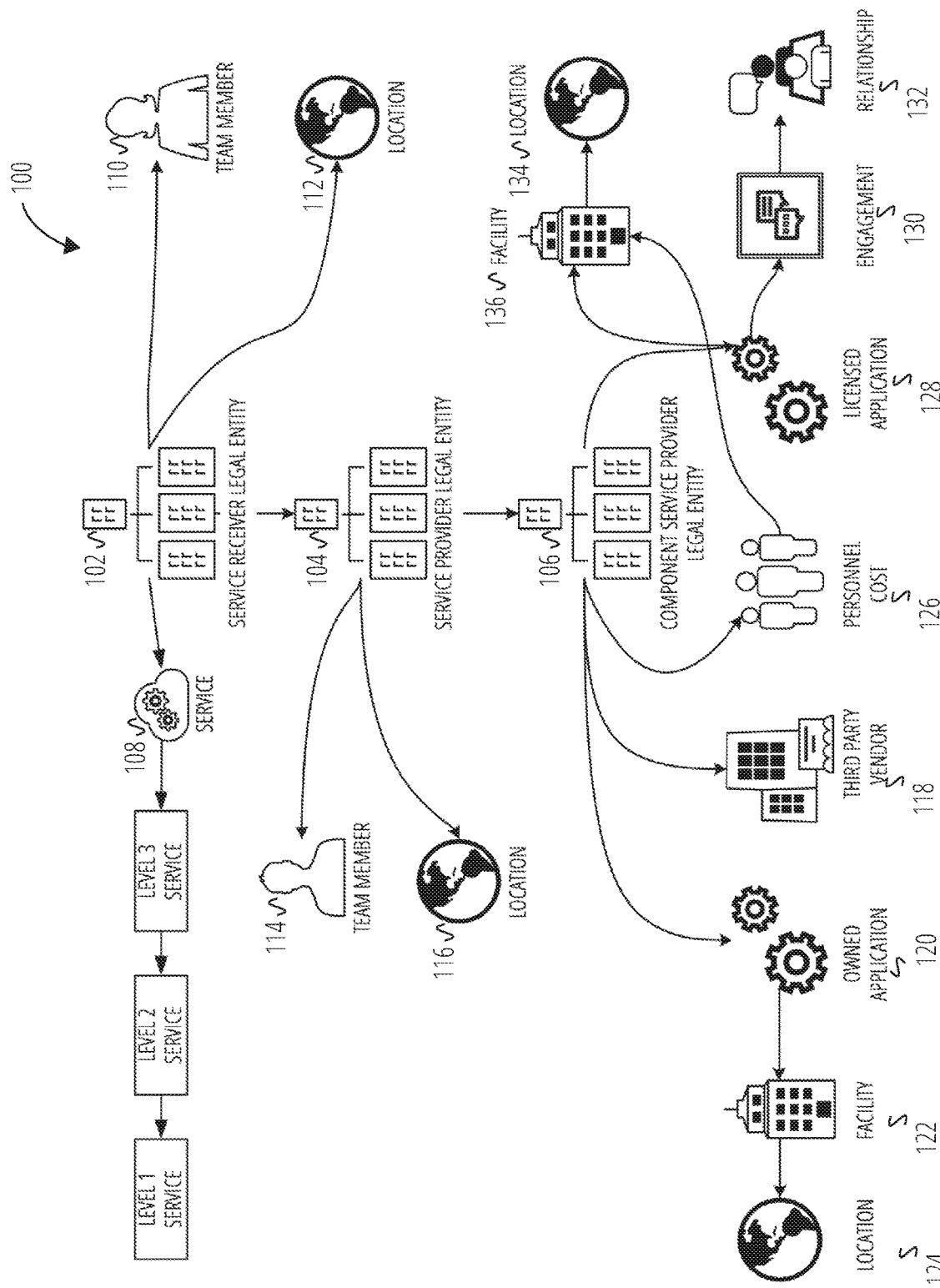
FIG. 1 is an entity link visualization diagram between concepts in a semantic ontology, according to various examples.

In the following description, for purposes of explanation, numerous specific details are set forth in order to provide a thorough understanding of some examples. It will be evident, however, to one skilled in the art that the present invention may be practiced without these specific details.

Throughout this disclosure, electronic actions may be performed by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., Random Access Memory (RAM), cache, hard drive) accessible by the component via an Application Programming Interface (API) or other program communication method. Similarly, the variables may be assumed to have default values should a specific value not be described. User interfaces may be provided for an end-user or administrator to edit the variable values in some instances.

In various examples described herein, user interfaces, such as knowledge graph visualizations, are described as being presented to a computing device. Presentation may include data transmitted (e.g., a hypertext markup language file) from a first device (such as a web server) to the computing device for rendering on a display device of the computing device via a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples these portions may be displayed on a screen at the same time, in other examples the portions/elements may be displayed on separate screens such that not all of the portions/elements are displayed simultaneously. Unless indicated as such, the use of "presenting a user interface" does not infer either one of these options.

Additionally, the elements and portions are sometimes described as being configured for a certain purpose. For example, an input element may be described as being configured to receive an input string. In this context, "configured to" may mean presentation of a user interface element that is capable of receiving user input. Thus, the input element may be an empty text box or a drop-down menu, among others. "Configured to" may additionally mean computer executable code processes interactions with the element/portion based on an event handler. Thus, a "search" button element may be configured to pass text received in the input element to a search routine that formats and executes a structured query language (SQL) query with respect to a database.

An enterprise (e.g., a company) may have many sub-entities that operate under a main entity. For example, Acme Inc., may have a subsidiary, Little Acme, Inc. For large enterprises, there may be hundreds of such entities. An entity may provide services or receive services (and, sometimes, both). A service provider may use other companies to provide portions (e.g., "components") of the provided services, which may be called component service providers. The failure of even one of the component service providers within a large enterprise may have a ripple effect that causes one or more entities of the enterprise to fail (e.g., become unable to perform its functions).

In addition to the problems that may be associated with a disrupted service, many enterprises are under regulatory rules to maintain their respective functions and document linkages between the associated entities. However, not all entities may be under such rules. Accordingly, some services may be designated as critical, while other services are not. As an extension, service providers and component service providers that support those critical service receivers may also need to be of a higher caliber nature, with more robust uptime requirements, and, accordingly, may be designated as material.

One possible solution to the challenges posed by large enterprise organizational structures may include a manual spreadsheet that attempts to manage the linkages between service providers, service receivers, and component service providers. However, this approach has several problems, including data integrity, data scalability, and data security. For example, spreadsheets are prone to human error, such as incorrect data entry, accidental deletion, or accidental modification of data. This can lead to inconsistencies in the data and make it difficult to trust and make decisions based on the information in the spreadsheet. Additionally, not all spreadsheets are designed to efficiently handle and run complex analysis on large amounts of data. As the number of legal entities (e.g., service providers and service receivers) and relationships between them increases, the spreadsheet can quickly become unwieldy and difficult to navigate. This may make it hard to find the information needed, as well as increase the chance for data entry errors. Computationally large spreadsheets also require domain expertise to read, write, and understand the underlying data. Domain expertise can become a logistical challenge and enterprise risk when the domain expert is unavailable to process data requests, and contingency measures are not adequate or available.

Accordingly, a more robust, accurate, and efficient system for tracking linkages between service providers, service receivers, and/or component service providers is needed. By using a different data structure, such as a knowledge graph-which is designed to handle large amounts of data and semantically link and analyze data-many of the issues and disadvantages discussed herein may be mitigated. This may make it much easier to manage and understand the relationships between legal entities within (and/or controlled by, and/or in connection with) a business for compliance, risk management, and decision-making. Furthermore, by presenting the data in a manner as discussed herein, a user may quickly be able to see what relationships links are being inferred and attest to the veracity of such links. In various examples discussed herein, a legal entity may refer to a business, line of business, division, sub-division, corporation, company, association, organization, group, or other business entity. It is appreciated that in various examples discussed herein, a sub-legal entity may be a legal entity that makes up part of a larger legal entity.

FIG. 1 is an entity link visualization diagram between concepts in a semantic ontology, according to various examples. FIG. 1 includes concepts of a service receiver legal entity 102, a service provider legal entity 104, a component service provider legal entity 106, a service 108, a team member 110, a location 112, a team member 114, a location 116, a third party vendor 118, an owned application 120, a facility 122, a location 124, a personnel cost 126, a licensed application 128, an engagement 130, a relationship 132, a location 134, and a facility 136.

The diagram in FIG. 1 may be an abstracted conceptual visualization of data linkages in of concepts in a semantic ontology. The semantic ontology may be considered a source chain ontology in various examples. The precise names and linkages shown are provided as an example, and other names and linkages may be used in various other examples. A semantic ontology may be a hierarchy of concepts. A concept may have one or more properties, and each property may have a value type (e.g., string, number, another concept, etc.). At a high level, a semantic ontology allows for generating triples (also referred to tuples herein) that use a subject-predicate-object (SPO) triple to define the relationships between the concepts. A concept may be represented as an entity type in a knowledge graph (as discussed in more detail below). A particular instance of an entity type may be referred to as an entity or object that is stored in the knowledge graph. The subject and object parts of an SPO triple may both be entities. Accordingly, this document will often use language such as a "ABC entity" or "ABC object" as a manner of identifying a particular entity node of the type "ABC."

The triples may be defined in a standardized format specification such as the resource description framework (RDF). The subject, object, and predicate may be a uniform resource identifier (URI), a value, or resource.

For Example, a Triple May be:
< (website)/legalentity/serviceprovider #entityname>
< (website)/legalentity/serviceprovider #location> "123 Main St."

The above triple may be representative of the SPO triple of "entity name has a location of 123 Main St". With reference to FIG. 1, service receiver legal entity 102 may be a service provider concept of the triple and location 112 may be the location concept. An extension of RDF is an RDF schema (RDFS), and relatedly the Web Ontology Language (OWL). These define additional syntax vocabularies to allow for more complex relationship definitions for concepts such as classes, subclasses, inheritance, etc. Furthermore, one semantic ontology may link to another entity or import the classes of another base ontology-thereby extending the base ontology.

Entity link visualization 100 may represent the topology of concepts in a service network. As seen, service receiver legal entity 102 may receive (e.g., make use of) service 108. Service receiver legal entity 102 (and service provider legal entity 104) may additionally have one (or more) associated team member 110 entities and associated locations 112 and 114.

A team member entity may correspond to an employee identifier, and a location may be an address, in various examples. Service receiver legal entity 102, service provider legal entity 104, and component service provider legal entity 106 may have respective values (not shown in FIG. 1) that correspond to the formal legal name of the corresponding business entity. Service provider legal entity 104 may be a business entity that provides service 108 to service receiver legal entity 102, and component service provider legal entity 106 may be the business entity that provides a component for service 108 to service provider legal entity 104. Service 108 may have additional levels of granularity defined from broadest to narrowest (e.g., from Level 3 to Level 2, to Level 1).

Component service provider legal entity 106 may be associated with many different entities. For example, component service provider legal entity 106 may have an owned application 120 (e.g., an application developed and maintained by that entity, such as a software application) or licensed application 128 (e.g., a third-party application). Either type of application may be hosted by a facility (e.g., facility 122 and facility 136), which in turn have their own locations (e.g., location 124 and location 134). In the instances of licensed application 128, there may be an entity (e.g., engagement 130) that indicates how component service provider legal entity 106 is engaged (e.g., a type of agreement) with licensed application 128 with a subclass of relationship 132. In some examples, component service provider legal entity 106 may utilize a third-party vendor 118. Another entity may store a value of personnel cost 126

(e.g., a percentage of available employee bandwidth/productivity or actual capital expenditures) with respect to component service provider legal entity 106 for service provider legal entity 104.

As indicated above, ontologies may be interconnected. In various examples, the service network ontology as depicted in FIG. 1 may utilize links to a language and country code ontology. Furthermore, it may import (and thus make use of) a corporation specific ontology, which in turn may have imported a subject-matter specific (e.g., medical, financial, educational, etc.) ontology. As previously discussed, FIG. 1 illustrates one example of a visualization of data linkages in an example semantic ontology. The precise names and linkages shown are provided for purposes of explanation, and in various other examples, visualizations may include a variety other names and linkages that are unique and dependent on the particular visualized concepts.

Figure 2:
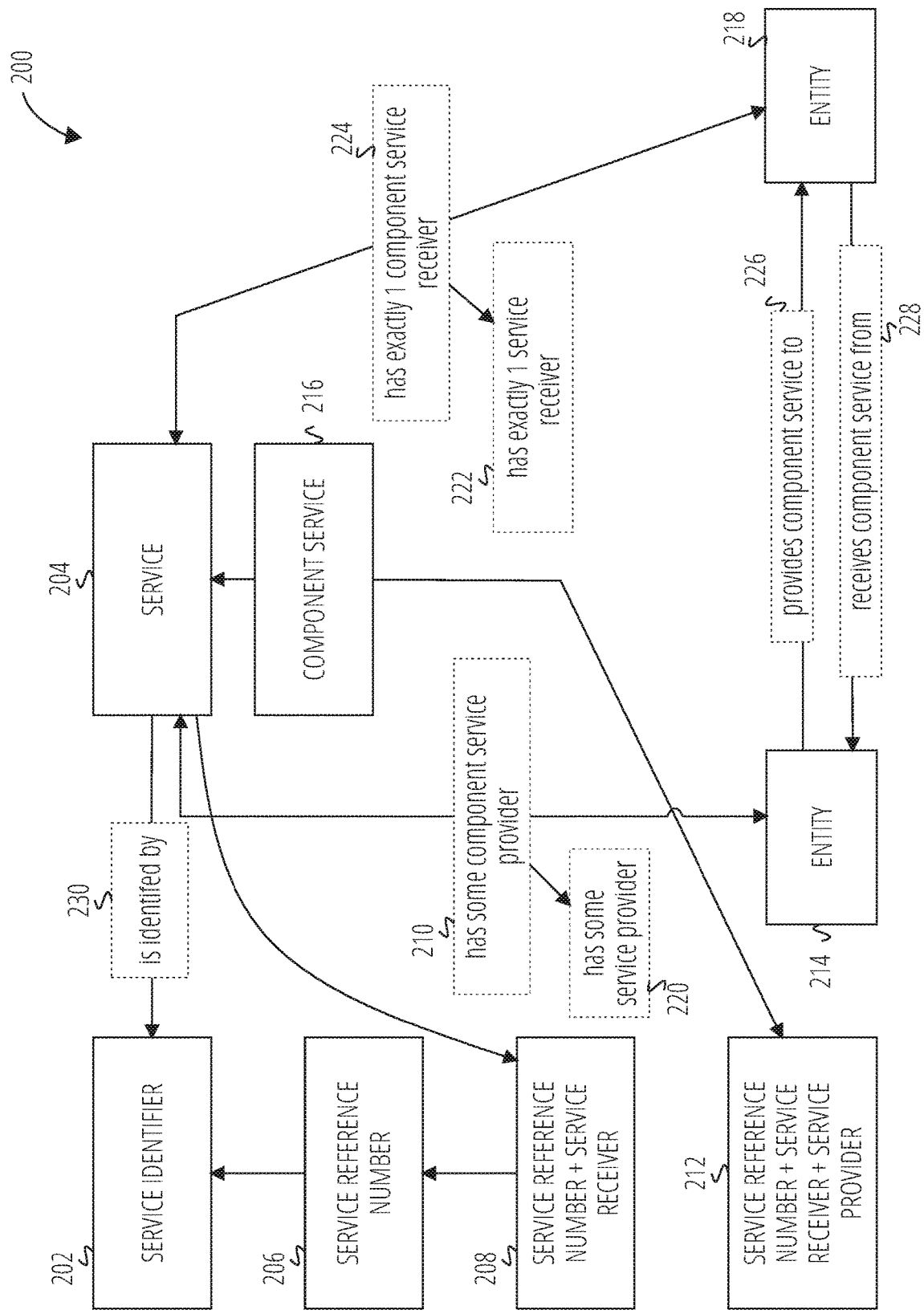
FIG. 2 is a visual representation of an ontology schema, according to various examples.

FIG. 2 is a visual representation 200 of a portion of an ontology schema, according to various examples. Visual representation 200 may be considered the logical definitions that govern an ontology for the entities depicted in the visualization of FIG. 1. FIG. 2 is presented as a subset of a source chain ontology and includes objects 202 to 218, and properties 220 to 230. For example, service object 204 may have a property (property 230) of "is identified by" service identifier object 202. Thus, a triple within a knowledge graph may be of the form <service object, is identified by, service identifier object>.

Furthermore, some of the links of the visual representation 200 are unlabeled. In these instances, it may be assumed there is "has a" property relationship. For example, service receiver object 206 may have a service identifier object 202 and component object 216 may have an object 212. Object 212 may be a concatenation of three identifiers (e.g., service reference number+service receiver+service provider) that originate from a source chain data file—similarly object 208 is a concatenation of a service reference number and service receiver.

It may also be seen that properties may also link or be associated with other properties. For example, property 224, which links service object 204 and entity object 218, has its own property 222—and similarly object 210 has property 220. One can also observe the reciprocal nature of relationships as object 214 has a "provides component service to" property 228 with respect object 218, and object 218 has a "receives component service from" property 230 with respect to object 214. The precise descriptions and links in visual representation 200 are an example, and other layouts and property labels may be used.

Figure 3:
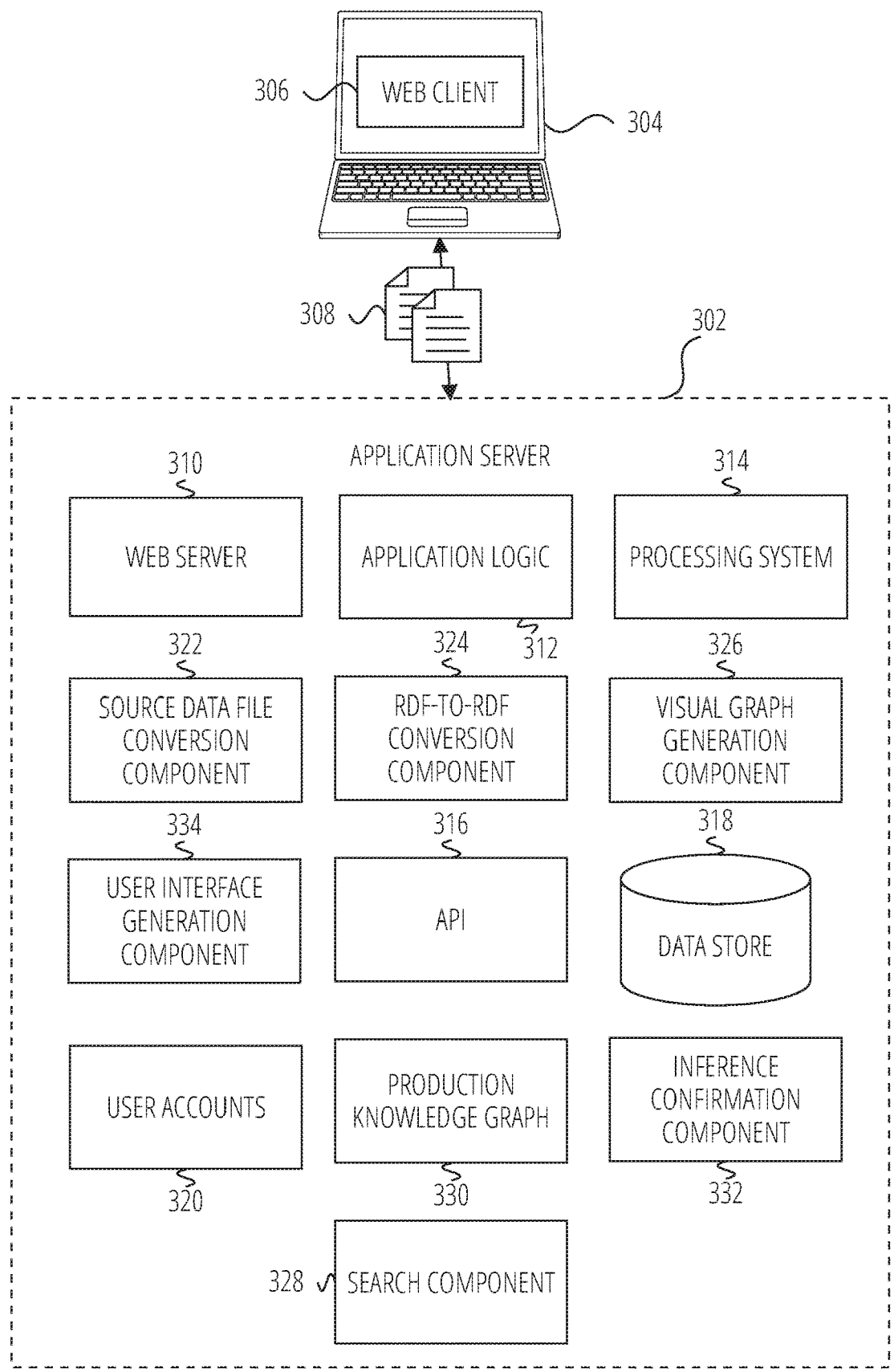
FIG. 3 is an illustration of components of a client device and knowledge graph application server, according to various examples.

FIG. 3 is an illustration of components of a client device and knowledge graph application server, according to various examples. FIG. 3 includes a knowledge graph application server 302, a client device 304, a web client 306, a data 308, a web server 310, an application logic 312, a processing system 314, an API 316, a data store 318, a user accounts 320, a source data file conversion component 322, an RDF-to-RDF conversion component 324, a visual graph generation component 326, a search component 328, a production knowledge graph 330, an inference confirmation component 332, and a user interface generation component 334.

Knowledge graph application server 302 is illustrated as set of separate elements (e.g., components, etc.). However, the functionality of multiple, individual elements may be performed by a single element. An element may represent computer program code that is executable by processing system 314. The program code may be stored on a storage device (e.g., data store 318) and loaded into a memory of the processing system 314 for execution. Portions of the program code may be executed in a parallel across multiple processing units (e.g., a core of a general-purpose computer processor, a graphical processing unit, an application specific integrated circuit, etc.) of processing system 314. Execution of the code may be performed on a single device or distributed across multiple devices. In some examples, the program code may be executed on a cloud platform (e.g., MICROSOFT AZURE® and AMAZON EC2®) using shared computing infrastructure.

Furthermore, several functions are discussed as being performed on knowledge graph application server 302 such as data ingestion, data processing, graph manipulations, visualizations, etc. As with the individual elements, these functions may be performed by one or more other servers. For example, one server may primarily be used for responding to visualization requests, and another server may primarily be used for responding to database queries.

Client device 304 may be a computing device which may be, but is not limited to, a smartphone, tablet, laptop, multi-processor system, microprocessor-based or programmable consumer electronics, game console, set-top box, or another device that a user utilizes to communicate over a network. In various examples, a computing device includes a display module (not shown) to display information (e.g., in the form of specially configured user interfaces). In some examples, computing devices may comprise one or more of a touch screen, camera, keyboard, microphone, or Global Positioning System (GPS) device.

A user may use a device such as client device 304 for a variety of purposes with respect to knowledge graph application server 302. For example, a data scientist may use client device 304 to edit an ontology (e.g., add properties of concept types, add new concepts, etc.). Another user may use client device 304 to query production knowledge graph 330 for a service and see the cost impact on an enterprise. Yet another user may use client device 304 to look at inferred relationships between server receivers and service providers and confirm if the relationship is real. Other use cases may be determined by a person having ordinary skill in the art upon review of this disclosure.

Client device 304 and knowledge graph application server 302 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks, or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

In some examples, the communication may occur using an application programming interface (API), such as API 316. An API provides a method for computing processes to exchange data. A web-based API (e.g., API 316) may permit communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored in a database (e.g., data store 318). For example, a user may activate a user interface (UI) element to initiate a search of a particular service receiver. In response, an API call may be generated that includes a JavaScript Object Notation (JSON) payload with a service receiver identifier. Knowledge graph application server 302 may receive the API call and, using search component 328, generate and issue a query to data store 318 for information on the service receiver and transmit the query results back to client device 304 for display. Another API call may be used to validate a presented inferred relationship.

Knowledge graph application server 302 may include web server 310 to enable data exchanges with client device 304 via web client 306. Although generally discussed in the context of delivering webpages via the Hypertext Transfer Protocol (HTTP), other network protocols may be utilized by web server 310 (e.g., File Transfer Protocol, Telnet, Secure Shell, etc.). A user may enter in a uniform resource identifier (URI) into web client 306 (e.g., the INTERNET EXPLORER® web browser by Microsoft Corporation or SAFARI® web browser by Apple Inc.) that corresponds to the logical location (e.g., an Internet Protocol address) of web server 310. In response, web server 310 may transmit a web page that is rendered on a display device of a client device (e.g., a mobile phone, desktop computer, etc.).

Additionally, web server 310 may enable a user to interact with one or more web applications provided in a transmitted web page. A web application may provide user interface (UI) components that are rendered on a display device of client device 304 using user interface generation component 334. The user may interact (e.g., select, move, enter text into) with the UI components, and based on the interaction, the web application may update one or more portions of the web page. A web application may be executed in whole, or in part, locally on client device 304. The web application may populate the UI components with data from external sources or internal sources (e.g., data store 318) in various examples. In various examples, the web application is a dynamic user interface that provides several ways to view and analyze data stored in production knowledge graph 330 as well as validate inferred relationships. These views and associated functionality are described in more detail with respect to the remaining figures.

The web application may be executed according to application logic 312. Application logic 312 may use the various elements of knowledge graph application server 302 to implement the web application. For example, application logic 312 may issue API calls to retrieve or store data from data store 318 and transmit it for display on client device 304. Similarly, data entered by a user into a UI component may be transmitted using API 316 back to the web server. Application logic 312 may use other elements (e.g., source data file conversion component 322, RDF-to-RDF conversion component 324, visual graph generation component 326, etc.) of knowledge graph application server 302 to perform functionality associated with the web application as described further herein.

Data store 318 may store data that is used by knowledge graph application server 302, such as production knowledge graph 330 and user profiles of user accounts 320. Data store 318 is depicted as a singular element but may in actuality be multiple data stores. The specific storage layout and model used in by data store 318 may take a number of forms-indeed, a data store 318 may utilize multiple models. Data store 318 may be, but is not limited to, a relational database (e.g., SQL), non-relational database (NoSQL) a flat file database, object model, document details model, graph database, shared ledger (e.g., blockchain), or a file system hierarchy. Data store 318 may store data on one or more storage devices (e.g., a hard disk, random access memory (RAM), etc.). The storage devices may be in standalone arrays, part of one or more servers, and may be located in one or more geographic areas.

User accounts 320 may include user profiles on users of knowledge graph application server 302. A user profile may include credential information such as a username and hash of a password. A user may enter in their username and plaintext password to a login page of knowledge graph application server 302 to view their user profile information or interfaces presented by knowledge graph application server 302 in various examples.

A user account may also include preferences of the user. The preferences may include default views and default graph visualization options. For example, a user may set the default levels (e.g., the number of links to follow down a graph database) of a visualization to three and the view to be a service receiver network view. The user account may also identify a role of the user. Different users may have different access rights with respect to data stored in production knowledge graph 330. For example, a data scientist may be able to edit a schema of an ontology, another user may be able to view service receiver links, but not view information on what service providers are considered material. Certain roles (e.g., a validator role) may enable other user interface panes to be displayed to enable verification of inferred link relationships. For example, inference confirmation component 332 may present specialized interfaces that are configured to receive confirmation from a user with a validator role that the inferred links (as defined in production knowledge graph 330) are correct, as discussed in more detail below in FIG. 5.

Figure 4:
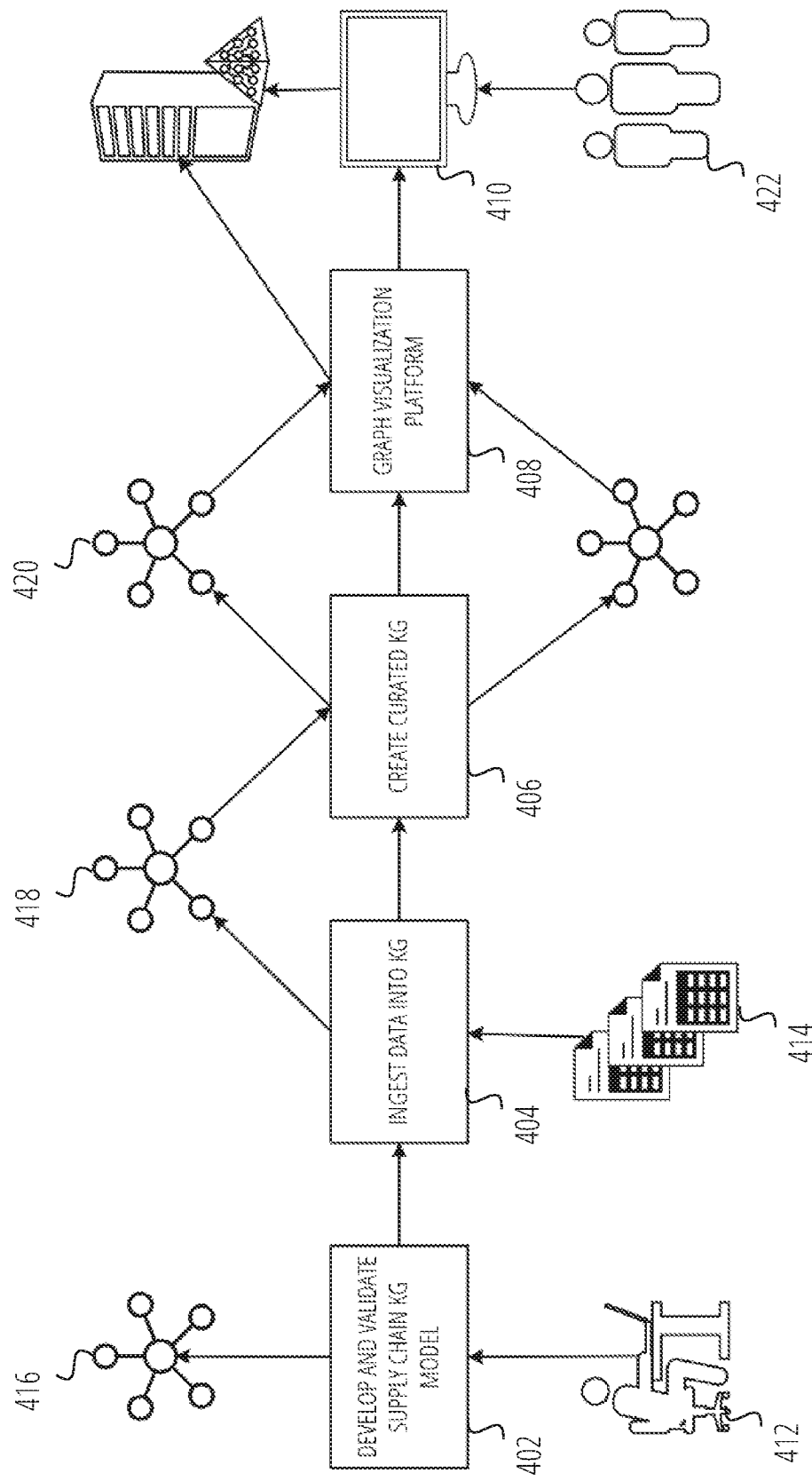
FIG. 4 is a process diagram of a process for generating a knowledge graph database, according to various examples.

FIG. 4 is a process diagram of a process for generating a knowledge graph database, according to various examples. FIG. 4 is illustrated as including a develop and validate operation 402, an ingestion operation 404, a curate graph operation 406, a visualization platform 408, a display device 410, data scientist users 412, input data sources 414, a source chain ontology 416, a raw source chain graph 418, a curated source chain graph 420, and end users 422. The operations described with respect to FIG. 4 may be performed by a computing device such as knowledge graph application server 302. For example, ingestion operation 404 may be performed by source data file conversion component 322, curate graph operation 406 may be performed by RDF-to-RDF conversion component 324, and the visualization platform 408 may be implemented by visual graph generation component 326.

As an initial matter, data scientist users 412 may generate a schema, referred to herein as source chain ontology 416. Source chain ontology 416 may be generated in several formats. A schema for an ontology is a set of rules and guidelines that define the structure, content, and relationships of the classes, properties, and individuals (e.g., people, businesses, objects) in the ontology. The schema may provide a formal specification of the ontology that may be used to guide the development, maintenance, and use of the ontology by different stakeholders and applications. For example, the schema may describe the concepts illustrated in FIG. 1.

The schema for an ontology may be expressed in various ways. For example, in OWL, the schema for an ontology may be expressed using OWL constructs, such as class and property axioms, restrictions, and annotations. In RDF, the schema for an ontology may be expressed using RDF vocabularies, such as RDFS (RDF Schema) and OWL, and may include definitions of classes, properties, and datatypes, as well as other metadata and documentation. Within the context of source chain ontology 416, the schema may identify the various classes such as a service receiver, service provider, component service provider and relationships between such classes. The schema may be based in part on an existing data source (e.g., input data sources 414) such as column headings in a spreadsheet or tables of a relational database. As an example, here is what a Person class and an Organization class may approximately look like in OWL:

Class: ex:Person
        SubClassOf: owl:Thing
        EquivalentTo:
            hasFirstName some xsd:string
            hasLastName some xsd:string
    Class: ex:Organization
        SubClassOf: owl:Thing
        EquivalentTo:
            hasName some xsd:string
            hasAddress some ex:Address
            hasEmployee only ex:Person
        ObjectProperty: ex:hasEmployee
            Domain: ex:Organization
            Range: ex:Person Ingestion operation 404 may convert the data in input data sources 414 to raw source chain graph 418. Depending on the format of input data sources 414, different algorithms may be executed by source data file conversion component 322. For example, if an input source is a spreadsheet in an XLS format, XLS2RDF may be used, whereas if an input source is a relational database table, SQL2RDF may be used.

Input data sources 414 may include one or more spreadsheets (e.g., source chain datafiles) that include data identifying properties and links between services, providers, and receivers. The spreadsheets may include several columns. For example, a portion of the spreadsheets may be for service providers and include columns such as "Provider Legal Entity ID" and "Provider Legal Entity Name." A service receiver portion may have columns for "Receiver Legal Entity ID" and "Receiver Legal Entity Name." Several more columns may be in the spreadsheet that identify locations of the service receivers and service providers and the relationship types of the service providers (e.g., intercompany relationship, external relationship, etc.). Service information may also be included in the spreadsheets and include a "Service ID" column and whether or not the service is considered critical, and associated information for each legal entity (e.g., location, identifiers, etc.). Accordingly, if one were to read a row, it may be determined that for a given service ID, there is a provider legal entity and a receiver legal entity, and component service providers.

The resulting raw source chain graph 418, after ingestion operation 404, may be a graph database that is full of triples based on the data in input data sources 414. The data may be considered raw as it does not yet conform to the source chain ontology 416. Instead, the identification of objects in raw source chain graph 418 may be based on the column headings in input data sources 414. Accordingly, if a heading was "SR_ID" for service receiver ID, and "SR_NM" for the service receivers legal name, a property may be <SR_ID, has_a, SR_NM>. While this may be technically correct, SR_ID may not appear in source chain ontology 416. Accordingly, a further operation (e.g., curate graph operation 406) may be used to translate raw source chain graph 418 to curated source chain graph 420.

For example, RDF2RDF scripts may be executed that include mappings between the object types, properties, etc., used in raw source chain graph 418 to the source chain ontology 416. Accordingly, triples that conform to source chain ontology 416 may be generated based on the triples in raw source chain graph 418. Furthermore, not all of the data that is in raw source chain graph 418 may be needed in curated source chain graph 420. Accordingly, the scripts may also specify what data to map and what data to ignore. Thus, the resulting curated source chain graph 420 may conform to source chain ontology 416, while also and being smaller in size (e.g., in data) than raw source chain graph 418, thereby saving storage space and increasing the speed of querying.

An additional aspect of curated source chain graph 420 is the inclusion of a graph link type. Graph link types may be classified as either inferred or explicit, in various examples. An explicit graph link type may be one in which the source chain data file does not have missing link data. For example, if there is a service provider in the source chain data file, there should be an identified link to a component provider somewhere in the source chain data file. If there is, the graph link type may be explicit. If, however, there is a missing link, scripts may be executed to determine an inferred link between a service provider and component provider (or other missing relationship type).

Curated source chain graph 420 may be used by visualization platform 408 to respond to queries and generate graph visualizations for client devices. For example, end users 422 may login to visualization platform 408 and request the service provider for a particular service. Visualization platform 408 may query curated source chain graph 420 and generate a graph visualization for display device 410. In various examples, visualization platform 408 may present user interfaces for attesting to the veracity of inferred graph link types.

Users may interface with a production knowledge graph, such as production knowledge graph 330 illustrated in FIG. 3, in several manners. For example, a user may search for object types that are stored in the production knowledge graph. For instance, a user may search for service receivers, service providers, component objects, licensed applications, etc. The results of the search may be presented as nodes and links between nodes in a graph presentation area on a display device of a client device (e.g., via web client 306 shown in FIG. 3). Depending on the type of object, the hierarchy of the results may differ. For example, if a service provider is searched, the head node of a presented graph may be a service provider, and the relationships with child nodes may be described with respect to the service provider. If a component object is searched, the component may be the head node, and the relationships with child nodes may be described with respect to the component.

Figure 5:
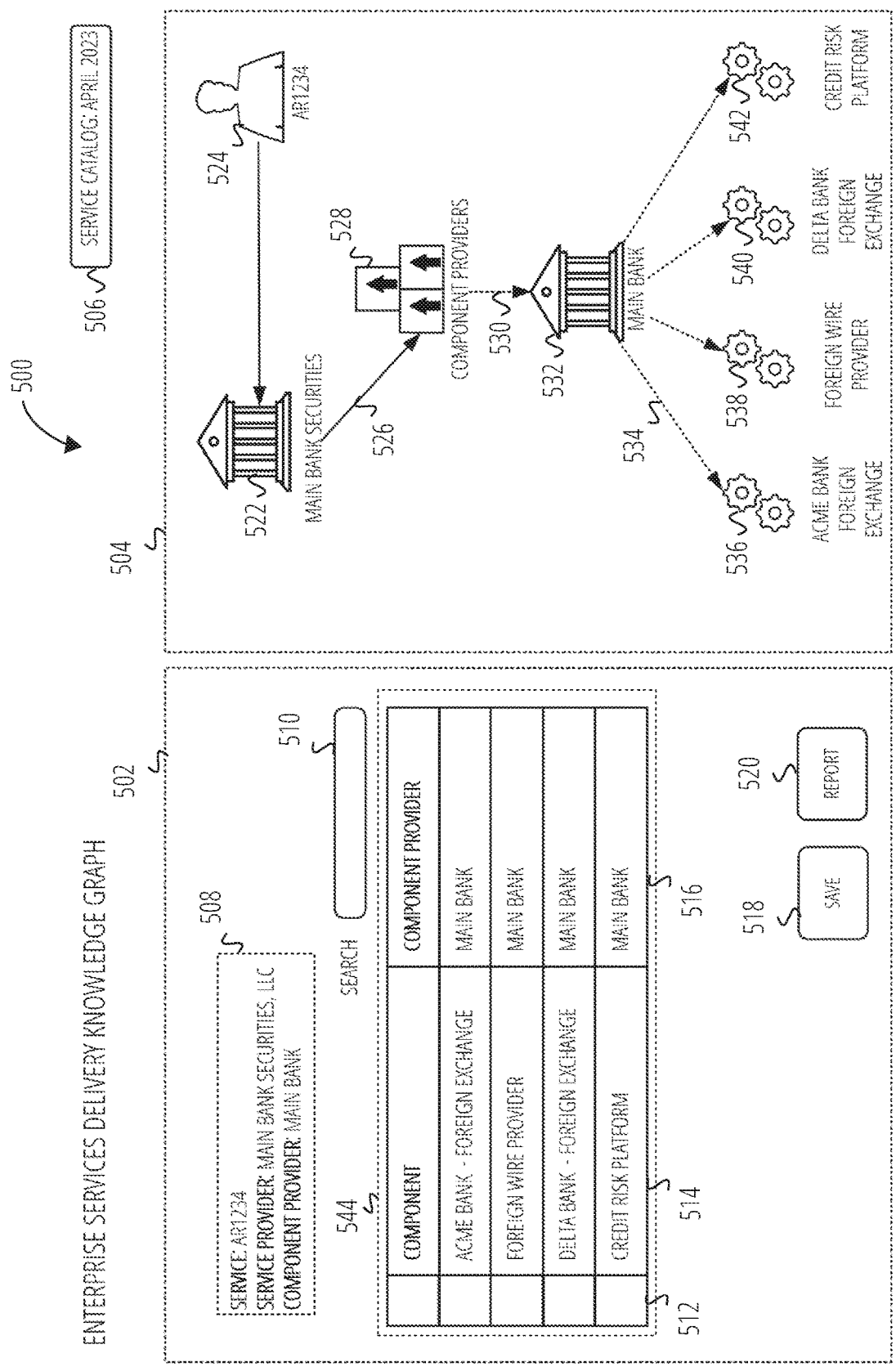
FIG. 5 is a user interface for confirming inferred graph link types, according to various examples.

FIG. 5 is a user interface 500 for confirming inferred graph link types, according to various examples. The user interface comprises a graph link type confirmation area 502, a graph presentation area 504, a catalog date selector 506, a link confirmation overview 508, a search element 510, a link type confirmation column 512, a component identification column 514, a component provider identification column 516, a save element 518, a report element 520, a service provider 522, a service 524, an explicit graph link type 526, a component providers 528, an inferred graph link type 530, a component provider 532, an inferred graph link type 534, a component 536, a component 538, a component 540, a component 542, and a table 544. As illustrated in FIG. 5, in some examples the user interface may include a graph link type confirmation area 502 and a graph presentation area 504 that are presented simultaneously and adjacent to each other. For example, FIG. 5 shows these areas being presented side-by-side (e.g., on a left-side and right-side of a user interface). In various examples, such an arrangement offers the advantage that a user may view and interact with both areas at the same time. FIG. 5 illustrates one example, and in various other examples other side-by-side arrangements may be configured.

User interface 500 may be presented after a user has selected a link in a navigation bar (not presented) that is configured for selection of different graph visualization views. For example, user interface 500 may have been generated using a component such as user interface generation component 334 after the user logs in to knowledge graph application server 302. The user may have an account in user accounts 320. Accordingly, the user may have a user identifier that is associated with one or more roles that in turn grant authorization to view certain types of data in a user interface. For example, a database table in data store 318 may indicate which user identifiers are associated with which role(s). Each role may have associated authorizations with respect to which interfaces are presented and options available within the interfaces.

For example, depending on the authorization levels attributable to the roles associated with user identifier that is currently logged-in, only a subset of the views may be presented. In the instance of user interface 500, a check may have been made (e.g., by user interface generation component 334) and determined that the user identifier is associated with a validator role. In various examples, a validator role authorizes a user to confirm whether or not an inferred link in a knowledge graph (e.g., production knowledge graph 330) is correct and can attest to that fact using an interface such as presented in graph link type confirmation area 502.

Catalog date selector 506 provides an indication of which source chain data file (e.g., service catalog) is currently being used for searching. A user may click on catalog date selector 506 to select—and search—a different service catalog if desired.

Additionally, user interface 500 may be the result of a search conducted by the user. Although not illustrated, an entity search box which may be different than search element 510, may be used to search for different entities in production knowledge graph 330. In the current scenario of user interface 500, a user may have searched for the service provider titled "Main Bank Securities, LLC," which may be used as an input string. After the input string is entered, search component 328 may execute a query to production knowledge graph 330 to find matching service providers using literal string matching, fuzzy matching, or similar matching using Levenshtein distance, etc. This query—and others described herein—may be made using SPARQL Protocol and RDF Query Language (SPARQL) queries or another graph database language.

A user interface element (e.g., such as a drop down or table), may be populated with the top ten (or other number) matched service provider objects. A service provider may then be selected from the populated user interface element. For example, for user interface 500, service provider 522 may have been selected. After the service provider has been selected, a subsequent query may be executed to production knowledge graph 330 for services that are provided by the service provider. The results may be presented, and a service selected by the user (e.g., service 524). After both a service provider and service have been selected, another query may be made to production knowledge graph 330 for component provider entities in the source chain of the service provider, with respect to the selected service. Visual graph generation component 326 may then generate a graph using the retrieved objects and present it in graph presentation area 504.

The resulting graph may be presented in several manners. Separately from a graph type, a user may select visualization and layout options (not illustrated in FIG. 5). For example, a graph layout selection element may present an option to use a tabular view of the results in graph presentation area 504 instead of a graph. Other visualization options may include, but are not limited to, a radial or hierarchical graph option, zoom and panning controls, and turning-on or -off edge labels between nodes. Different graph visualization platforms may be used to generate the objects in graph presentation area 504 (e.g., Neo4j Bloom or Gephi).

The objects in graph presentation area 504 may be interacted with (e.g., by the user) in several manners. For example, a user may move the objects within the graph presentation area 504 by performing a click-hold-drag operation using an input device such as a mouse, or a finger when using a touch-enabled display device. As a user moves an object within the graph presentation area 504, the edges connecting the moved object may move as well.

With reference to graph presentation area 504, the presentation style of links between objects may differ depending on the graph link type stored in production knowledge graph 330. For example, explicit graph link type 526 is illustrated as a solid line, whereas inferred graph link type 530 and inferred graph link type 534 are both shown as dotted lines. In various examples, explicit graph link type 534 may be illustrated in a first style, and inferred graph link type 530 may be illustrated in a second style that is different from the first style. In addition to solid and dotted lines, other presentation styles may be used as well to differentiate graph link types such as color, line thickness, etc. In various examples, the different presentation styles of the links between objects offers advantages of increased intelligibility and optimization of complex interconnected information on the limited visual landscape of most display devices.

The inferred graph link type classification may be stored as part of production knowledge graph 330, for example, as a property. For example, component provider 532 may have a "is inferred component provider" property with respect to component 536. A link may be classified as inferred as part of curate graph operation 406. For example, as multiple source chain datafiles are input over a period of time(s), if a link existed in one but not another, that link may be inferred for the source chain data file that does not have the link. That is, it may be determined from at least the existing linking in first source chain datafile that the link should also exist for a second source chain datafile, but because it does not, it will be classified as an inferred link.

The presentation of graph presentation area 504 does not, by itself, guarantee that graph link type confirmation area 502 is presented. For example, many users may have access to view and interact with a graph, such as within graph presentation area 504. However, not all users may be authorized confirm inferred graph link types in graph link type confirmation area 502. In various examples, if a user is authorized (e.g., to confirm inferred graph link types), a toggle control may be presented to hide or show graph link type confirmation area 502 when the results of searching production knowledge graph 330.

Data populated in graph link type confirmation area 502 may be based on what is currently being viewed in graph presentation area 504 or the totality of results from a search. For example, it is common for the number of entities returned by a search to exceed the amount of space (e.g., visual space/landscape) in graph presentation area 504 to practically view all the results in a graph form. Accordingly, various visualization controls may be used to zoom-in or -out, filter the results, etc. As indicated previously, a user may also manually click-and-drag the objects (e.g., components, service provider 522, service 524, component providers 528) around graph presentation area 504.

For illustration purposes, consider that a user has set a preference to show information in graph link type confirmation area 502 based on what is currently displayed in graph presentation area 504. Accordingly, link confirmation overview 508 indicates the current service, service provider, and component provider of graph presentation area 504. If additional component providers were displayed, link confirmation overview 508 may include identification of those as well.

Table 544 may display rows of elements in graph link type confirmation area 502 that have an inferred graph link type in the graph presentation area 504. As illustrated, table 544 includes three columns: link type confirmation column 512, component identification column 514, and component provider identification column 516. The displayed information in component identification column 514 and component provider identification column 516, and correspondingly illustrated in graph presentation area 504 may be based on queries to production knowledge graph 330.

Search element 510 may be used to dynamically filter information in table 544. For example, if a user types in "Acme Bank", rows that do not contain the string "Acme Bank" in the component identification column 514 will be removed from the table (e.g., the bottom three rows of table 544). Search element 510 may be useful when a user has indicated to include all search results in table 544 of a particular (e.g., inferred) graph link type in confirmation area 502 regardless of what is currently displayed in graph presentation area 504. A user may click (e.g., using an input device such as a mouse, or a finger when using a touch-enabled display device) the column headings to sort the table alphabetically, in various examples.

A user may click (e.g., using an input device such as a mouse, or a finger when using a touch-enabled display device) the cells in link type confirmation column 512 to confirm that the inferred graph link type between a component and component provider is correct. A user may make such determination by researching the entities associated with a link and verifying that it is indeed correct. In some instances, it is possible that a source chain data file did not include the identification link by mistake. In other instances, it is possible that the link was unconfirmed, but is now known to be true based on the user's research. Regardless of the reasoning, the user may make the determination and click (e.g., using an input device such as a mouse, or a finger when using a touch-enabled display device) the cell in link type confirmation column 512.

A user may also activate save element 518 to preserve the user made confirmations in production knowledge graph 330 (e.g., by executing a SPARQL query). The user may also activate report element 520 to generate a data file that may be used to update a subsequent source chain data file. These operations are discussed further in the context of the following figures.

Figure 6:
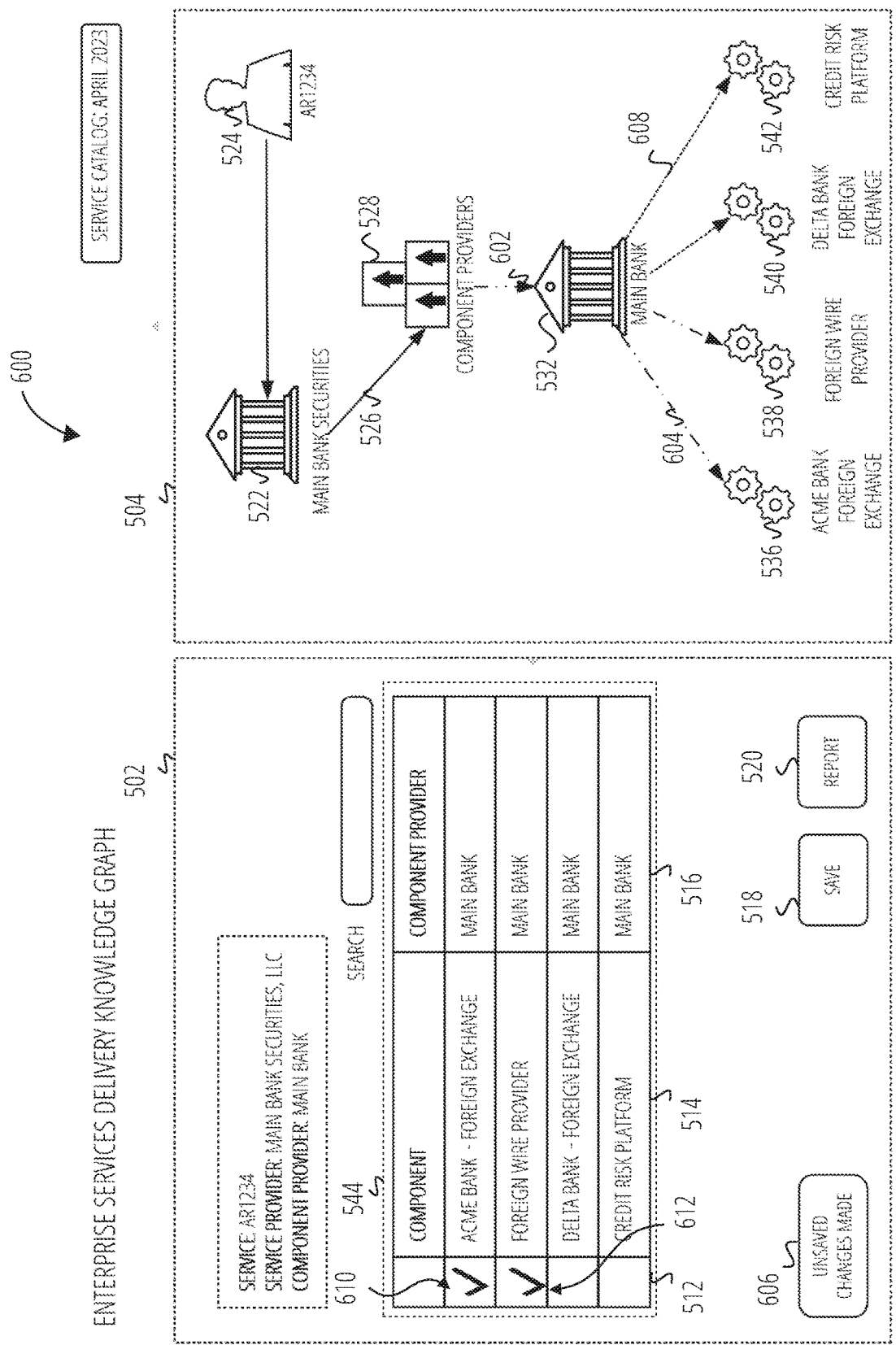
FIG. 6 is a user interface showing confirmed inferred graph link types, according to various examples.

FIG. 6 is a user interface 600 showing confirmed inferred graph link types, according to various examples. FIG. 6 is discussed as an example view of an interface after interacting with a graph link type confirmation area 502 such as was presented in FIG. 5. User interface 600 reuses many of the same element labels as in FIG. 5 but shows a state after a user has interacted with link type confirmation column 512, in various examples. User interface 600 includes a graph link type confirmation area 502, a graph presentation area 504, a link type confirmation column 512, a component identification column 514, a component provider identification column 516, a save element 518, a report element 520, a service provider 522, a service 524, an explicit graph link type 526, a component providers 528, a component 536, a component 538, a component 540, a component 542, a table 544, a link 602, a confirmed graph link type 604, an unsaved changes element 606, an inferred graph link type 608, a confirmation indication 610, and a confirmation indication 612.

User interface 600 may represent a user interface state after the user has made selections in link type confirmation column 512 presented in FIG. 5, but before the user has selected save element 518. In the example of user interface 600, the user has confirmed the inferred link between component 536 and component provider 532 as well as the inferred link between component 538 and component provider 532—as evidenced by the presented check marks in cells of link type confirmation column 512. The presented check marks may be the result of a user activating (e.g., clicking) the cells. Upon activation, application logic (e.g., such as application logic 312 of FIG. 3) may have updated the presentation styles of links in graph presentation area 504 to the state they are presented in user interface 600. The application logic may also have presented the check marks (e.g., confirmation indication 612) in link type confirmation column 512.

For example, within the rows of table 544 corresponding to the components "Acme Bank Foreign Exchange" and "Foreign Wire Provider", it may be observed that user interface 600 illustrates confirmation indication 610 and confirmation indication 612. Specifically, a checkmark is shown, but other indicators (e.g., dots, filled in boxes, color changes, etc.) may be used to indicate the confirmation accordingly. Furthermore, if a user has not yet activated save element 518, a warning element such as unsaved changes element 606 may be presented to alert the user to save any changes in response to a user attempting to navigate away (e.g., initiate a new search, select a back button a web client, etc.) from the currently viewed user interface 600.

In various examples, updates to graph presentation area 504 may be dynamically executed based on the presence (or lack thereof) of confirmation indications in link type confirmation column 512 of user interface 600. For example, the presentation style of links implicated by the confirmation indications may change based on the presence (or absence) of a confirmation indication. Thus, in case of user interface 600, the links between component 536 and component 538, with respect to component provider 532, have both been updated to a new link presentation style. In the presented example in user interface 600, the new link presentation style is distinct from an explicit link presentation style and an inferred link presentation style, but in other examples the new link presentation style could be the same as an explicit link presentation style.

The link presentation style between component provider 532 and component 542 remains the same in user interface 600 as it did in user interface 500. However, the link between component 536 and component provider 532 in user interface 600 is now a confirmed graph link type 604 and as such uses a different link presentation style than the link between component 536 and component provider 532 of user interface 500 (e.g., inferred graph link type 534 of FIG. 5). Confirmed graph link type 604 now has a link presentation style (e.g., dotted line pattern) that differs from inferred graph link type 608 and explicit graph link types—thereby creating three different link presentation styles.

In addition to changing the link presentation style of direct links between components (e.g., between component 536 and component provider 532 in FIG. 6), presentation style changes may also be made to links of other objects implicated by the presentation style changes of links in graph presentation area 504. For example, component providers 528 is a group object that represents the component provider entity type (e.g., of production knowledge graph 330 in FIG. 3). In the case of graph presentation area 504 in user interface 600, there is only the single component provider, component provider 532. Link presentation style rules may be stored as part of a visual graph generation component (e.g., such as visual graph generation component 326 of FIG. 3). For example, one rule may be that changes a link presentation style of the link between a component provider and component providers 528 if the link presentation style of a link of any of the links between the component provider and its related components has changed—for example, as a response to a confirmation indication being placed in link type confirmation column 512.

With reference back to graph presentation area 504 of user interface 600, the presentation style of the link between component 536 and component provider 532 (e.g., confirmed graph link type 604) is now a confirmed link presentation style—in contrast to the inferred link presentation style of inferred graph link type 534 in FIG. 5. Consequently, the link between component provider 532 and component providers 528 (e.g., link 602 of FIG. 6) is now a confirmed link presentation style from its prior inferred presentation link style (inferred graph link type 530) of FIG. 5.

Other link presentation style rules may also be stored. For example, the presentation style change may propagate further update up a graph. "Up" means a traversal towards the head node of a graph. For example, confirmed graph link type 604 is lower than link 602 and link 602 is lower than explicit graph link type 526. Accordingly, another rule may be that a link may adopt the presentation style of any changed link that is lower in the graph. In such an instance, explicit graph link type 526 in FIG. 6 may be changed to the confirmed link presentation style.

Another rule may identify a priority of link presentation styles to use when there are multiple styles present "down" from a current link. For example, a confirmed link presentation style may be the highest priority, then an inferred link presentation style, and then an explicit link presentation style. Thus, as illustrated in FIG. 6, link 602 has the confirmed link presentation style as opposed to an inferred graph link presentation style. In this manner, a user may quickly visually ascertain that there has been change made for at least one component provider down the graph of component providers 528 in FIG. 6. As indicated before, other presentation styles of links beyond those illustrated in the figures may be used as well to differentiate the classification of graph link types (e.g., inferred, explicit) in a knowledge graph (e.g., production knowledge graph 330) such as color, line thickness, etc.

The link presentation style rules may also be useful when, due to the limited visual landscape (e.g., screen size) of most display devices, not all of the components may be viewed simultaneously in a graph presentation area. However, because of the link presentation rules, a user may quickly ascertain that there is at least one inferred link between a component and component provider because of the inferred link presentation style between a component providers object (e.g., such as component providers 528 of FIG. 5) and a component provider (e.g., component provider 532 of FIG. 5) even if the component is not currently viewable in a graph presentation area.

Referring back to FIG. 6, save element 518 may be used (e.g., clicked) to commit the changes—as determined by the selections in link type confirmation column 512—to production knowledge graph 330. For example, a SPARQL update command may be executed to change the graph link type property between the entities in production knowledge graph 330 that represent component provider 532 and component 536 to an explicit graph link type. However, there may be no need for a separate SPARQL command for link 602 because no change is actually being made in production knowledge graph 330 between component provider 532 and component providers 528. Instead, after the user activates save element 518 in FIG. 6, the presentation style of link 602 may change back to the inferred graph link type as depicted in inferred graph link type 530 of FIG. 5—unless all the inferred graph links types have been confirmed, in which case link 602 may have the explicit graph link presentation style applied.

FIG. 7 illustrates sample content of an output link confirmation report, according to various examples. The report contents 700 include a service column 702, a service provider column 704, a component provider column 706, a component column 708, and a status column 710. FIG. 7 illustrates one possible example, and in various other examples the report may include a different arrangement of content.

A report that includes report content 700 may be the result of activation of report element 520 in FIG. 6. The format of the contents of the report, as well as the file type of the report, may be set according to a user preference. For example, report content 700 is in a table format with multiple columns. The table may be part of a spreadsheet file. Furthermore, the layout (e.g., the column headings) of the table may correspond to that of the currently selected source chain data file (Service Catalog: April 2023). Thus, the report may be sent to a user, or automated process, to incorporate the changes made with respect to the inferred graph link types that were confirmed by the user.

For example, consider the first row in report content 700. The service column 702 cell indicates Service AR123, which corresponds to service 524 of FIG. 6. The service provider column 704 cell corresponds to service provider 522. The component provider column 706 cell corresponds to component provider 532. The component column 708 cell corresponds to component 536. Finally, the status column 710 cell corresponds to the fact that a user confirmed the inferred link was an explicit link. Accordingly, when viewing the report content 700 across a given row, such as row 712, a viewer is presented with a service, the corresponding service provider, the corresponding component provider(s), the corresponding component(s), and the corresponding status (e.g., confirmed or not).

Figure 8:
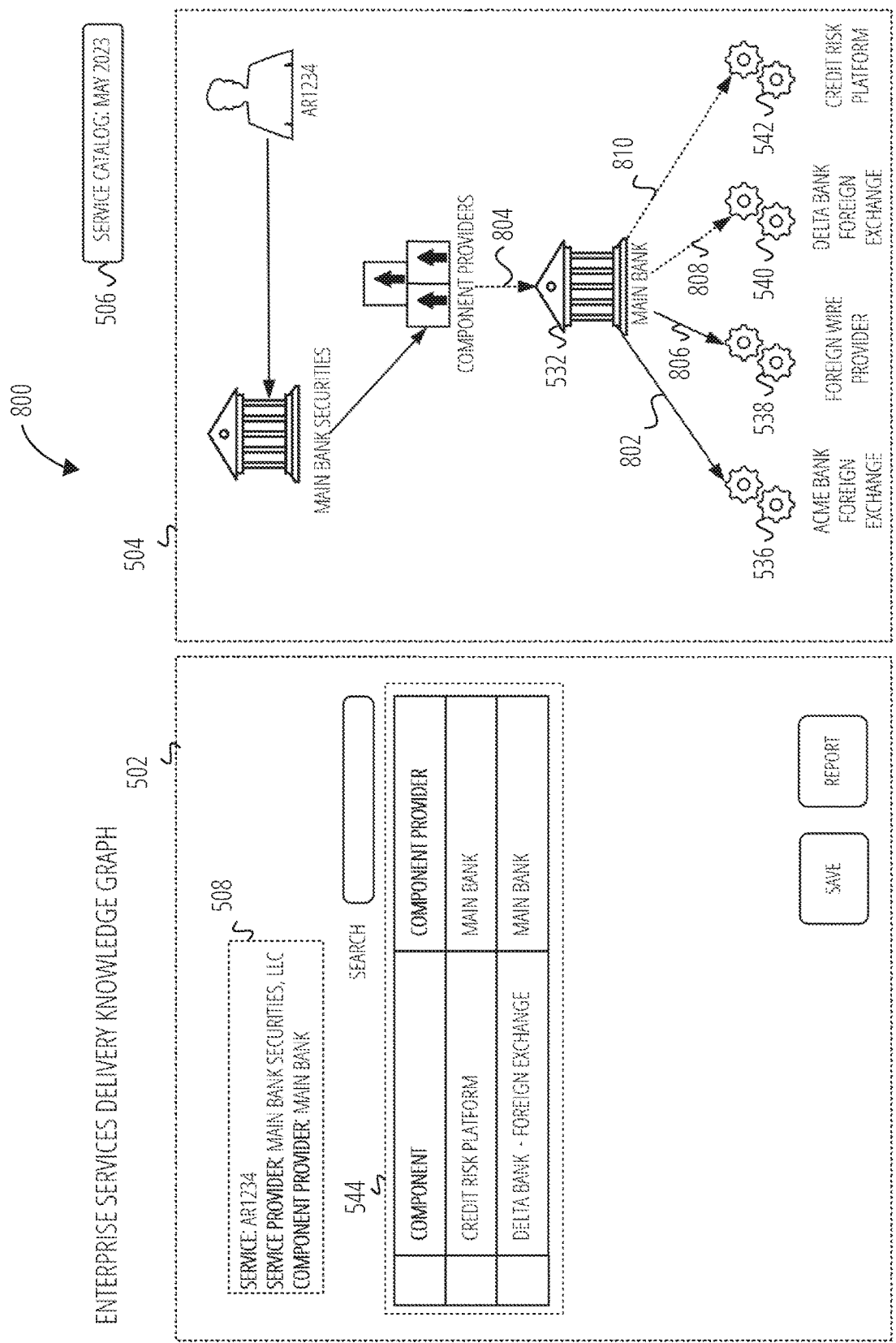
FIG. 8 is a user interface for confirming inferred graph link types, according to various examples.

FIG. 8 is a user interface for confirming inferred graph link types, according to various examples. The user interface 800 includes a graph link type confirmation area 502, a graph presentation area 504, a catalog date selector 506, a link confirmation overview 508, a component provider 532, a component 536, a component 538, a component 540, a component 542, a table 544, an explicit graph link type 802, an inferred graph link type 804, an explicit graph link type 806, an inferred graph link type 808, and an inferred graph link type 810. User interface 800 may be presented at a time subsequent to user interface 600 and after which a user has saved any changes using save element 518.

As may be observed in FIG. 8, catalog date selector 506 now references "May 2023", as opposed to "April 2023 in FIG. 5. Thus, in FIG. 8, production knowledge graph 330 may have been updated to include any data from the source chain data file with respect to May of 2023. This may, for example, include an update based on a report, such as outputted in FIG. 7. Thus, after production knowledge graph 330 has been updated, if a user conducts the same search as was described with reference to the user interface 500 of FIG. 5, the results may now only include two inferred graph link types—as opposed to the four that were present in user interface 500. FIG. 8 illustrates an example of this difference, e.g., illustrating two inferred graph link types and two explicit graph link types.

User interface 800 shows within graph presentation area 504 explicit graph link type 802 and explicit graph link type 806, which previously were inferred graph link types (e.g., inferred graph link type 534 and component 538 of FIG. 5). Furthermore, two graph link types remain (inferred graph link type 808 and inferred graph link type 810) the same link presentation style as they appeared in FIG. 5 (the links are not labeled in FIG. 5). It may further be noted that the inferred graph link type 804 element retains the link presentation styling of an inferred graph link type as there are still inferred graph link types down the graph from component provider 532. Additionally, because there are now only two inferred graph link types being presented, table 544 of FIG. 8 includes two rows, in contrast with the four rows in FIG. 5.

Figure 9:
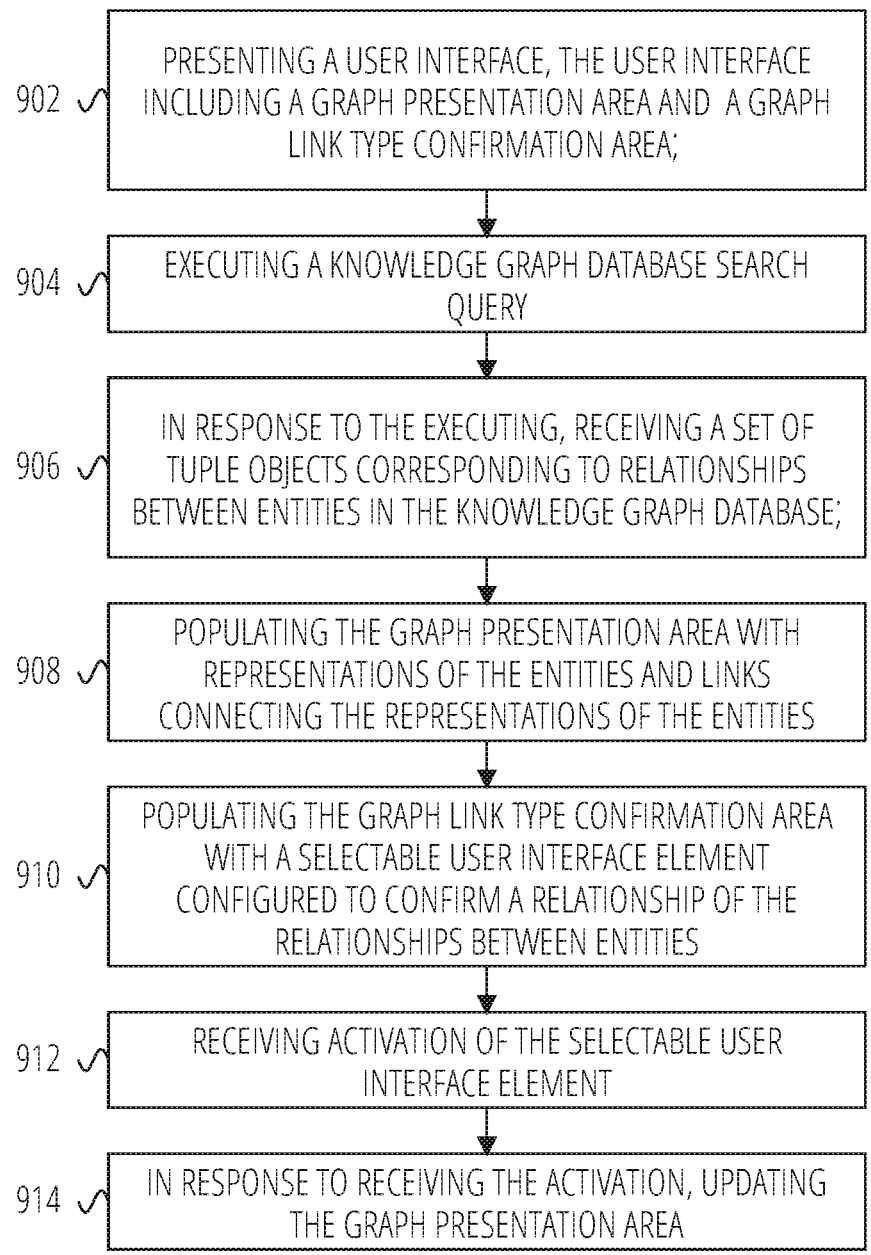
FIG. 9 is a flowchart illustrating a method for visualization and confirmation of graph link types of a knowledge graph, according to various examples.

FIG. 9 is a flowchart illustrating a method for visualization and confirmation of graph link types of a knowledge graph, according to various examples. The method is represented as a set of blocks that describe operations 902 to 914. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 9. The one or more processors may instruct other components of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

In various examples, the method at operation 902 may include presenting a user interface, the user interface including a graph presentation area, a graph link type confirmation area. For example, the graph presentation area and graph link type confirmation area may be ones such as discussed in FIG. 5 as generated by a user interface component such as user interface generation component 334

In various examples, the method at operation 904 may include executing a knowledge graph database search query. For example, a user may search for an entity in production knowledge graph 330, such as a service provider, component provider, etc. A user may select one of the results of the executed search, and further select a service associated with one of the results. The result of the search may be a set of tuple objects.

In various examples, the method at operation 906 may include receiving a set of tuple objects corresponding to relationships between entities in the knowledge graph database, in response to executing the knowledge graph database search query (e.g., operation 904). A tuple may be in the form of a Subject, Object, Predicate format, as discussed above.

In various examples, the method at operation 908 may include populating the graph presentation area with representations of the entities and links connecting the representations of the entities. For example, a graph, such as in graph presentation area 504 of user interface 500, may be presented in which a service provider entity is represented as a bank and a component entity is presented as two gears.

The method may also include where populating the graph presentation area with representations of the entities and links connecting the representations of the entities includes for a link of the links connecting the representations of entities between a representation of a first entity and a representation of a second entity, determining a type of the link. For example, a SPARQL query may be executed to production knowledge graph 330 illustrated in FIG. 3 to determine the link type. In other examples, the link type may be determined by accessing a link type property in the search results of operation 906. A presentation style for the link in the graph presentation area may be selected based on the type of the link. Selecting may include querying a lookup table or map that identifies a presentation style for the link type and applying the style to the link in the graph presentation area. For example, a blue line may be used for explicit graph link types and a red line for inferred graph link types. Thus, a presentation style for an inferred link type may be different than a presentation style for an explicit link type.

In various examples, the method at operation 910 may include populating the graph link type confirmation area with a selectable user interface element configured to confirm a relationship of the relationships between entities. For example, a graph link type confirmation area 502 may be presented with a table that includes selectable cells (e.g., in link type confirmation column 512). In various examples, the method at operation 912 may include receiving activation of the selectable user interface element. Activation may include a user clicking on a cell (e.g., using an input device such as a mouse, or a finger when using a touch-enabled display device), in various examples.

The method described with reference to the flowchart of FIG. 9 may also include where the type of link is an inferred link and where populating the graph link type confirmation area with the selectable user interface element configured to confirm a relationship of the relationships between entities includes presenting identification of the first entity and the second entity. The identification may be the legal identifier of each entity. For example, in FIG. 5, component 536 has a legal identifier of "ACME BANK—FOREIGN EXCHANGE."

In various examples, the method at operation 914 may include, in response to receiving the activation of the selectable user interface element (e.g., operation 912), updating the graph presentation area. For example, updating the graph presentation area may include changing a presentation style of the link. The changed presentation style may differ from that of the presentation style of the explicit inferred graph links types and the inferred graph link types (as previously discussed herein).

The method may also include executing an update database command to the knowledge graph database to update the type of the link between the first entity and second entity to a confirmed inferred link type. For example, the confirmed inferred link type may have a property set to "explicit link type" after receiving the activation of the element and a save command.

The method may also include receiving an indication of activation of a report generation element (e.g., report element 520 described with reference to at least FIG. 5), and in response to receiving the indication, generating a data file including a current state of the graph link type confirmation area. The data file may be a spreadsheet document, in various examples. The current state may include indications of which inferred relationships have been confirmed in the graph link type confirmation area, in various examples. Other technical features may be readily apparent to one skilled in the art from the following figures, descriptions, and claims.

Figure 10:
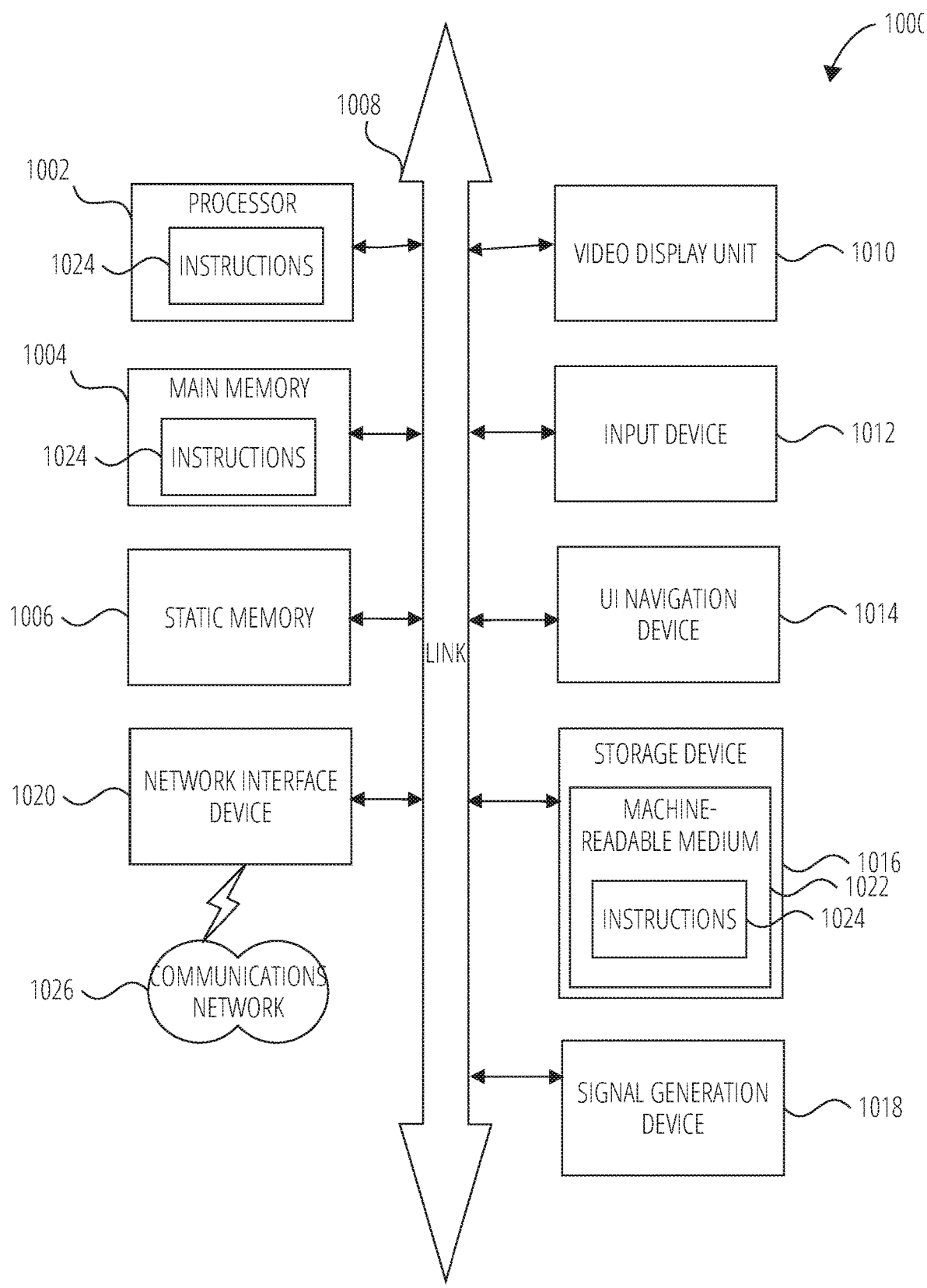
FIG. 10 is a block diagram illustrating a machine in the example form of computer system, within which a set or sequence of instructions may be executed to cause the machine to perform any one of the methodologies discussed herein, according to various examples.

FIG. 10 is a block diagram illustrating a machine in the example form of computer system 1000, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via a link 1008. The computer system 1000 may further include a video display unit 1010, an input device 1012 (e.g., a keyboard), and a user interface (UI) navigation device 1014 (e.g., a mouse). In one embodiment, the video display unit 1010, input device 1012, and UI navigation device 1014 are incorporated into a single device housing such as a touch screen display. The computer system 1000 may additionally include a storage device 1016 (e.g., a drive unit), a signal generation device 1018 (e.g., a speaker), a network interface device 1020, and one or more sensors (not shown), such as a global positioning system (GPS) sensor, compass, accelerometer, or other sensors.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media.

While the machine-readable medium 1022 is illustrated in an example embodiment to be a single medium, the term "machine-readable medium" may include a single medium or multiple media (e.g., a centralized or distributed Database, and/or associated caches and servers) that store the one or more instructions 1024. The term "machine-readable medium" shall also be taken to include any tangible medium that is capable of storing, encoding, or carrying instructions for execution by the machine and that cause the machine to perform any one or more of the methodologies of the present disclosure or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 1022 that excluded transitory signals.

The instructions 1024 may further be transmitted or received over a communications network 1026 using a transmission medium via the network interface device 1020 utilizing any one of a number of well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
 presenting a user interface, the user interface including:
  a graph presentation area; and
  a graph link type confirmation area;
 executing a knowledge graph database search query;
 in response to the executing:
  receiving a set of tuple objects corresponding to relationships between entities in the knowledge graph database;

populating the graph presentation area with representations of the entities and links connecting the representations of the entities; and
populating the graph link type confirmation area with:
an identification of a first entity of the entities;
an identification of a second entity of the entities; and
a non-activated link type confirmation element configured to, when activated, confirm a link type relationship between the first entity and the second entity;
receiving activation of the link type confirmation element; and
in response to receiving the activation, updating the graph presentation area.

2. The method of claim 1, wherein populating the graph presentation area with representations of the entities and links connecting the representations of the entities includes:
for a link, of the links connecting the representations of entities, between a representation of the first entity and a representation of the second entity, determining a type of the link; and
selecting a presentation style for the link in the graph presentation area based on the type of the link.

3. The method of claim 2, wherein a presentation style for an inferred link type is different than a presentation style for an explicit link type.

4. The method of claim 2, wherein the type of the link is stored in the knowledge graph database.

5. The method of claim 2, wherein updating the graph presentation area includes changing a presentation style of the link.

6. The method of claim 2, further comprising executing an update database command to the knowledge graph database to update the type of the link between the first entity and second entity to a confirmed inferred link type.

7. The method of claim 2, further comprising:
receiving an indication of activation of a report generation element; and
in response to receiving the indication, generating a data file including a current state of the graph link type confirmation area.

8. A non-transitory computer-readable medium comprising instructions, which when executed by a processing unit, configure the processing unit to perform operations comprising:
presenting a user interface, the user interface including:
a graph presentation area; and
a graph link type confirmation area;
executing a knowledge graph database search query;
in response to the executing:
receiving a set of tuple objects corresponding to relationships between entities in the knowledge graph database;
populating the graph presentation area with representations of the entities and links connecting the representations of the entities; and
populating the graph link type confirmation area with:
an identification of a first entity of the entities;
an identification of a second entity of the entities; and
a non-activated link type confirmation element configured to, when activated, confirm a link type relationship between the first entity and the second entity;
receiving activation of the link type confirmation element; and
in response to receiving the activation, updating the graph presentation area.

9. The non-transitory computer-readable medium of claim 8, wherein populating the graph presentation area with representations of the entities and links connecting the representations of the entities includes:
for a link, of the links connecting the representations of entities, between a representation of the first entity and a representation of the second entity, determining a type of the link; and
selecting a presentation style for the link in the graph presentation area based on the type of the link.

10. The non-transitory computer-readable medium of claim 9, wherein a presentation style for an inferred link type is different than a presentation style for an explicit link type.

11. The non-transitory computer-readable medium of claim 9, wherein the type of the link is stored in the knowledge graph database.

12. The non-transitory computer-readable medium of claim 9, wherein updating the graph presentation area includes changing a presentation style of the link.

13. The non-transitory computer-readable medium of claim 9, wherein the instructions, which when executed by the processing unit, further configure the processing unit to perform operations comprising:
executing an update database command to the knowledge graph database to update the type of the link between the first entity and second entity to a confirmed inferred link type.

14. The non-transitory computer-readable medium of claim 9, wherein the instructions, which when executed by the processing unit, further configure the processing unit to perform operations comprising:
receiving an indication of activation of a report generation element; and
in response to receiving the indication, generating a data file including a current state of the graph link type confirmation area.

15. A system comprising:
a processing unit; and
a storage device comprising instructions, which when executed by the processing unit, configure the processing unit to perform operations comprising:
presenting a user interface, the user interface including:
a graph presentation area; and
a graph link type confirmation area;
executing a knowledge graph database search query;
in response to the executing:
receiving a set of tuple objects corresponding to relationships between entities in the knowledge graph database;
populating the graph presentation area with representations of the entities and links connecting the representations of the entities; and
populating the graph link type confirmation area with:
an identification of a first entity of the entities;
an identification of a second entity of the entities; and
a non-activated link type confirmation element configured to, when activated, confirm a link type relationship between the first entity and the second entity;
receiving activation of the link type confirmation element; and
in response to receiving the activation, updating the graph presentation area.

16. The system of claim 15, wherein populating the graph presentation area with representations of the entities and links connecting the representations of the entities includes:
    for a link, of the links connecting the representations of entities, between a representation of the first entity and a representation of the second entity, determining a type of the link; and
    selecting a presentation style for the link in the graph presentation area based on the type of the link.

17. The system of claim 16, wherein a presentation style for an inferred link type is different than a presentation style for an explicit link type.

\* \* \* \* \*